WILLIAM H. WARD.
Improvement in Collecting Electricity for Telegraphing, &c.
No. 126,356. Patented April 30, 1872.
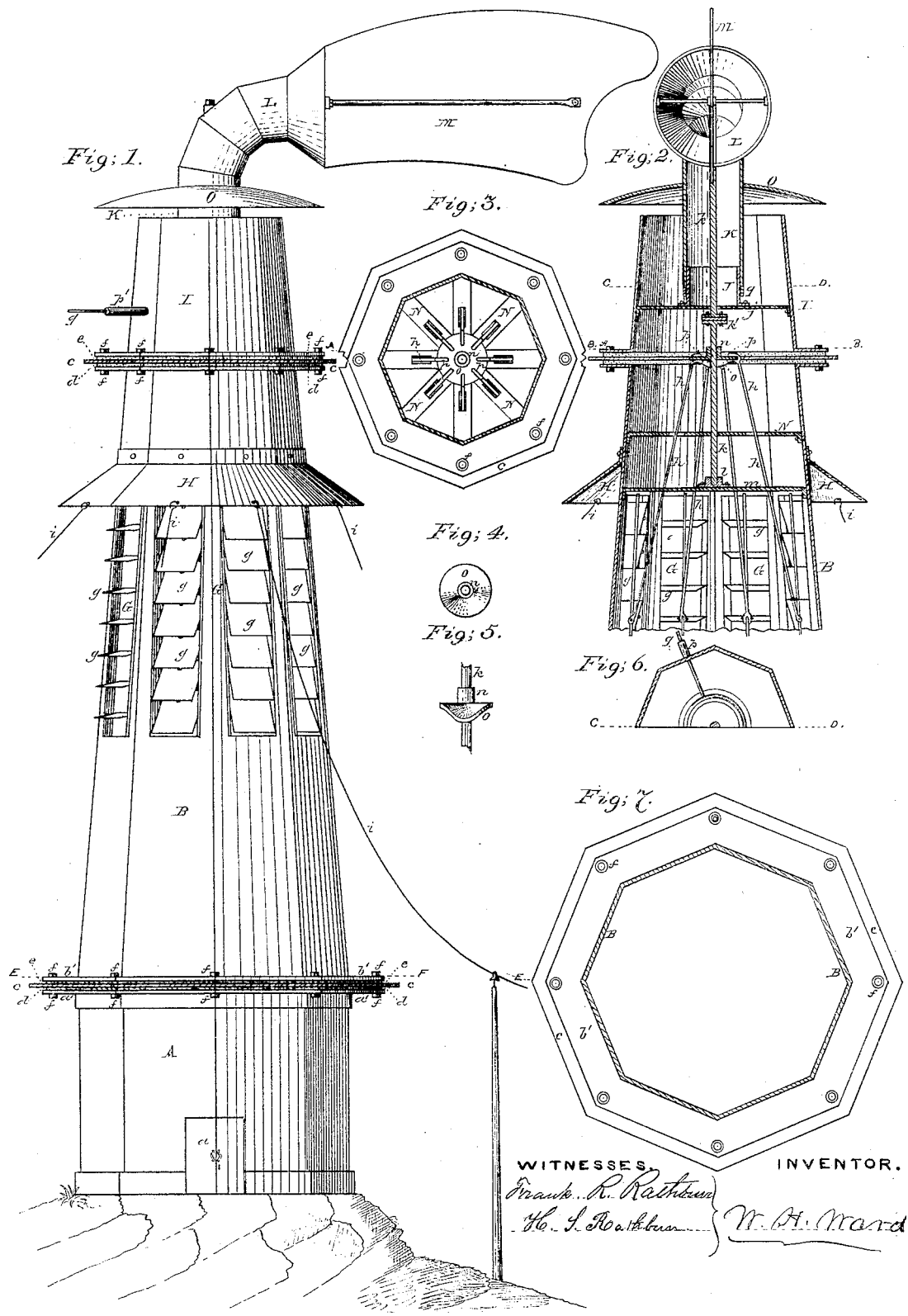
WITNESSES
Frank R. Rathbun
H. S. Rathbun
INVENTOR.
W. H. Ward

126,356

UNITED STATES PATENT OFFICE.

WILLIAM HENRY WARD, OF AUBURN, NEW YORK.

IMPROVEMENT IN COLLECTING ELECTRICITY FOR TELEGRAPHING, &c.

Specification forming part of Letters Patent No. 126,356, dated April 30, 1872.

I, WILLIAM HENRY WARD, of Auburn, in the county of Cayuga and State of New York, have invented an Electrical Tower for Accumulating Natural Electricity for Telegraphic Purposes, of which the following is a specification:

My invention consists of a tower for the purpose of receiving and imparting natural electricity, so as to be in constant contact with that upper stratum of electricity which surrounds the earth, by tapping which a never-failing supply is formed when brought into contact with the earth, as will be more fully explained hereinafter.

In the accompanying drawing, Figure 1 represents a side elevation of my improved electrical tower. Fig. 2 is a vertical central section of the upper part of the same. Figs. 3, 4, 5, 6, and 7 are detached views of several parts of the same.

The tower is constructed in three separate sections, a lower, a middle, and an upper one, and is placed on elevated mountain tops or peaks. The lower one, A, is a mere shell, having a door, $a$, and is constructed of any material suitable for the purpose. It is insulated from the middle portion B by means of a glass diaphragm, $c$, held between similar diaphragms of rubber, $d$, and of gutta-percha, $e$, by means of flanges $a'$ and $b'$, formed on the upper end of the lower portion and the lower end of the middle portion of the tower respectively. These flanges are secured to each other by insulated bolts $f$. The middle portion B is provided with suitable openings or windows, G, having shutters or slats $g$ pivoted in them, so that, by means of raising or lowering rods $h$, suitably connected to said shutters, the openings G may be shut or opened. A projecting roof, H, is formed on or secured to the middle portion B just over the openings G, and which serves the double purpose of protecting the said openings from the effects of the weather, such as rain or snow, and also for receiving the aerial electricity, which may be drawn from it by wires $i$, for land-line purposes. Above this roof H the middle portion of the tower is again insulated by diaphragms of glass, rubber, and gutta-percha from the upper portion I of the tower in the same manner as it is insulated from its lower portion. A circular plate, $j$, secured on the inside of this upper portion, bears a short tube, J, which is surrounded by the tube K of the ventilator L, from which latter the vane M extends; or the tube J may be held by rods extending from the side of the tower centrally. This ventilator is supported by a rod or shaft, $k$, firmly attached to the tube K, and having its lower bearing in a step, $l$, on a brace, $m$, crossing the middle portion B of the tower just above the openings G. This rod or shaft $k$ is formed in two parts, insulated from each other, as shown at $k'$. On the lower portion of this shaft $k$ is keyed or otherwise secured a sleeve, $n$, from which a horizontal serpentine cam-plate, $o$, shown in detail in Figs. 4 and 5, extends, over the rim of which the forked ends $p$ of rods $h$ seize, and which is so arranged relatively to the vane M and the shutters or slats $g$ that the revolution of the vane by the wind will open the windward and close the leeward shutters or slats $g$ and openings G by means of the rods $h$. Guide-plates or their equivalents N, provided with suitable openings, through which the rods $h$ pass, keep the upper forked ends $h$ of the latter in constant contact with the cam-plate $o$, which raises or lowers the rods, and consequently opens or closes the openings G as it revolves. A circular roof, O, extends from the tube K of the ventilator so as to cover and protect the open upper end of the tower. The upper portion I of the tower is provided with an insulating-tube, $p'$, through which a copper wire, $q$, enters the portion I of the tower, and is coiled around the tube J just under the tube K, which wire may connect that upper portion of the tower with any land line of wires. The upper portion I of the tower, as well as the tubes J K, may be constructed of zinc, while the vane may be made of zinc, copper, or any equivalent material, which, with the zinc and the moisture of the atmosphere, would form an electrical current. As the vane revolves it opens the openings to windward and closes those to leeward, thus helping to drive an aerial current of electricity into the insulated middle portion of the tower, which current passes upwardly through the upper portion of the tower and out through the ventilator or the top, which is swung around by the wind or aerial electrical current, thus forming a draught in addition to the closing of the shutters or openings to leeward, by means of which draught the electrical current is forced upwardly and out at the vane. The top portion of the tower is of course completely insulated from all below it, including the revolving central ventilator-shaft. As the middle portion of the tower allows the electrical current of atmosphere, wind, &c., to pass within, up, and out at the top it forms a continuous current, whereby the tower is receiving continually fresh and new supplies of electricity, which can be drawn from the projecting roof H by the wires $i$ for the use of land lines of telegraphs or for other purposes, such as light, heat, &c. By the use of aerial electricity I entirely dispense with artificial batteries, forming my circuit merely by connecting the aerial current with the earth current. For instance, to bring Buenos Ayres, in South America, into direct connection with New York, the following plan would be pursued: One electrical tower is erected on Pike's Peak or any other suitable high mountain in North America, and another similar tower on some suitable peak of the Andes in South America. The former would, by means of land-lines, be connected directly with Denver, which place is again connected with all the prominent cities of the States. In a similar manner the southern tower is connected by land-lines with the prominent cities via Quito. New York telegraphs to the tower on Pike's Peak, and the operator having connected the land-line with the aerial current, the signals are transmitted through the aerial current to the tower in the Andes in South America; and from there—the land-lines being suitably connected with the aerial current—to Quito and Buenos Ayres. In this manner a message would be sent entirely by natural electricity in place of artificial. In the same manner a message may be sent across the ocean by having a high tower on each continent, each of which towers would have to be, of course, through land-lines connected with the earth to enable the ground current with the aerial current to form a circuit. Different towers may be erected on the different continents, and if they are all what is technically called hooked on—that is to say, connected to the earth—a signal given at one tower will be repeated at all the towers, they being connected with each other by the aerial current. If the earth-connection is severed, or the insulation with the tower destroyed, there is no power; but by insulating the tower and concentrating its force to a point, bringing the same corresponding effect from the earth current in connection, an exceedingly powerful electrical force is created.

Having described my invention, I claim—

1. A tower constructed so as to collect, hold, distribute, and utilize aerial currents of natural electricity for telegraphic and other purposes, essentially as described.

2. A tower for collecting aerial currents of natural electricity, constructed of three sections, insulated from each other and the earth, or their equivalents, substantially in the manner described.

3. In an electrical tower, the combination of the shutters or slats $g$ with the ventilator-vane in such a manner that the vane, through suitable mechanism, always opens the shutters to windward and closes them to leeward, substantially as described.

4. In an electrical tower, the collecting, distributing, and protecting roof H, substantially as and for the purpose described.

5. The combination of the tube J and ventilator L with its vane M and the coiled wire or small cable $q$, substantially as and for the purpose set forth.

6. The combination of the insulated shaft $k$ and rods $h$ having forked upper ends $k'$ with the shutters or blinds $g$, serpentine cam-plate $o$, and ventilator L, substantially as and for the purpose described.

The above specification of my improvement, being a tower for accumulating natural electricity for telegraphic purposes, signed this 29th day of June, A. D. 1871.

W. H. WARD.

Witnesses:
A. L. PALMER,
J. H. STARIN.